United States Patent [19]
Normann et al.

[11] Patent Number: 6,124,786
[45] Date of Patent: Sep. 26, 2000

[54] DEVICE FOR CONTROLLING THE TIRE PRESSURE OF AUTOMOBILES BY MEANS OF A BATTERY-POWERED CIRCUIT

[75] Inventors: Norbert Normann, Niefern-Öschelbronn; Gunter Lothar Schulze, Ispringen; Günter Uhl, Helmstadt-Bargen, all of Germany

[73] Assignee: Ami Doduco GmbH, Pforzheim, Germany

[21] Appl. No.: 09/242,240

[22] PCT Filed: Jul. 18, 1997

[86] PCT No.: PCT/EP97/03849

§ 371 Date: Mar. 5, 1999

§ 102(e) Date: Mar. 15, 1999

[87] PCT Pub. No.: WO98/05519

PCT Pub. Date: Feb. 12, 1998

[30] Foreign Application Priority Data

Aug. 7, 1996 [DE] Germany .......................... 196 31 784

[51] Int. Cl.[7] .................................................. B60C 23/00
[52] U.S. Cl. .......................... 340/447; 340/442; 340/443; 340/626; 73/146.2; 73/146.5; 73/146.8
[58] Field of Search ..................... 340/442, 443, 340/447, 626; 73/146.2, 146.5, 146.8

[56] References Cited

U.S. PATENT DOCUMENTS

| | | | |
|---|---|---|---|
| 3,859,628 | 1/1975 | Favini | 340/58 |
| 4,006,326 | 2/1977 | Lejeune | 200/61.24 |
| 4,734,674 | 3/1988 | Thomas et al. | 340/58 |
| 4,793,277 | 12/1988 | Hass et al. | 116/34 R |
| 5,285,189 | 2/1994 | Nowiicki et al. | 340/447 |
| 5,559,484 | 9/1996 | Nowicki et al. | 340/447 |
| 5,721,374 | 2/1998 | Siekkinen et al. | 73/146.2 |

*Primary Examiner*—Jeffery A. Hofsass
*Assistant Examiner*—Hung Nguyen
*Attorney, Agent, or Firm*—Orum & Roth

[57] ABSTRACT

An apparatus for monitoring tire pressure on automobiles, having an arrangement (1), intended for installation into a wheel, made up of a pressure sensor, a transmitter, and a circuit for operating the pressure sensor and transmitter, and having a battery (2) which supplies the circuit with power via a power supply line (3), the arrangement (1) and the battery (2) being located in a sealed housing (9). Located in the power supply line (3) is an electronic switch (4) which has a control electrode (5) and is nonconductive when the control electrode (5) is connected to ground.

9 Claims, 1 Drawing Sheet

DEVICE FOR CONTROLLING THE TIRE PRESSURE OF AUTOMOBILES BY MEANS OF A BATTERY-POWERED CIRCUIT

The present invention is based on an apparatus having the features recited in claim 1. An apparatus of this kind is known from WO 93/16891, and coacts with a "wheel electronics package," mounted on the respective wheel, which contains a pressure sensor, a circuit for processing the pressure measurement signal, a transmitter with transmission antenna, and a battery. The wheel electronics packages send their pressure measurement data to one or more reception antennas which are connected to a common control device in the body which contains a receiver, an analysis circuit, and a display unit. The wheel electronics packages send their signals at regular time intervals to the central control device, and draw from the battery, for which the longest possible operating life in the automobile (7 to 10 years) is desired, the energy required for operating the pressure sensor and the circuit which processes the pressure measurement signal, and for the transmitter. Achieving this service life requires on the one hand ensuring that the current consumption for operation of the wheel electronics packages is as low as possible. A particular problem arises from the fact that because of the way the wheel electronics package is installed on the wheel, in particular as an extension of the valve in the air space of the tire, the entire electronic unit, including the battery, should, for reasons relating to design and operating reliability, be hermetically encapsulated, preferably completely enveloped in a sealing compound. This means that after final installation of the wheel electronics package, the battery is connected to its loads and current is withdrawn from the battery in the stipulated pressure measurement and transmission cycles even if the wheel electronics package is not immediately put into service in the automobile but rather is initially stored, for example as a replacement part, in a warehouse, which can easily occur for one or two years. The subsequent service life in the automobile is therefore shortened by an amount equal to the storage time, which is undesirable.

It is the object of the present invention to indicate a way in which to counteract the shortening of the service life on the automobile of a hermetically encapsulated wheel electronics package of the kind cited initially.

In order to achieve this object, it might be envisioned to provide between the battery and the electrical loads of the wheel electronics package a switch which is open during the storage period of the wheel electronics package and is closed only when the wheel electronics package is used on the automobile (U.S. Pat. No. 4.734.674). Interfering with this, however, is the fact that the entire wheel electronics package is hermetically sealed, preventing any mechanical switch actuation from outside. Consideration might also be given to providing a reed switch or similar magnetically actuable switch which can be closed by bringing a powerful magnet into the vicinity of the housing of the wheel electronics package. A solution of this kind may be eliminated, however, because it lacks reliability: if the switch is open for a long period, insulating films, e.g. oxides and/or plastics from the surrounding material, may form on the contact surfaces, thus increasing the contact resistance so as to create the risk that any electrical connection made will be unreliable or indeed entirely absent. In addition, a switch, even a reed switch, contains at least one resilient contact element. When the automobile is driven, the wheel electronics package is exposed to severe vibration loads, which may lead to breakage of a contact element due to material fatigue. A switch also requires space in the wheel electronics package, which can be provided only with difficulty under the defined installation conditions. Switches can be miniaturized, but this does not achieve the object, since smaller contact elements have less mechanical load capacity, and miniaturization therefore inevitably results in unreliable operation. If what is desired for the battery is a service life of 7 to 10 years, however, the wheel electronics package must moreover be so reliable that if the battery is functioning, it does not cease to operate because of a malfunction.

The manner in which the object is achieved according to the present invention is the subject matter of claim 1. Advantageous developments of the invention are the subject matter of the dependent claims.

The invention elegantly achieves the stated object by the fact that it does not even consider solving the problem by means of a mechanical switch which might be held open to prevent current consumption during the storage period of the wheel electronics package. What is used instead, according to the present invention, is an electronic switch, in particular a transistor switch, which is located in the power supply line between the battery and the current loads of the wheel electronics package and is nonconductive during the storage period of the wheel electronics package. Although an electronic switch does consume a small leakage current even when it is nonconductive, that current can nevertheless be made so low that it is of no importance for the duration of a one- to two-year storage period. Commercially available transistor switches exist whose leakage current is less than 1 microampere. In order to enable the electronic switch to be switched from its nonconducting state to its conductive state despite a hermetically sealed housing which cannot be opened for switching purposes, provision is made according to the present invention for the electronic switch to be installed so that it is nonconductive when it has a control electrode connected to ground, and becomes conductive when the ground connection to the control electrode is interrupted. This creates the possibility of interrupting the ground connection by way of an action to be performed on the housing of the wheel electronics package. In an embodiment of the invention, a portion of the housing wall could be flexibly configured, and there could be provided beneath it a snap switch which is opened by pushing in the flexible wall—without violating the hermetic seal of the housing—and remains open because its open position is a stable position, for example as a result of a snap mechanism. Another possibility is to provide beneath the flexible housing wall a brittle segment of the power supply line which breaks when the flexible housing wall is pushed in; breakage can be facilitated by the face that one or more defined break points are located in the line that is to be broken.

Particularly preferred, however, is an embodiment of the invention in which the line which connects the control electrode to ground passes outward in hermetically sealed fashion through the housing wall and runs partially on the outer side of the housing, so that it can easily be interrupted. The fact that the points at which the line is interrupted later oxidize or otherwise change in any way is immaterial, since this line has no function after being interrupted. The line could be applied for a certain distance onto the outer side of the housing by electrochemical coating or by way of a conductive paint; in this case the external portion of the line could be at least partially scraped away with a sharp-edged tool, with a knife or a screwdriver. Another advantageous possibility is to configure that portion of the line connecting the control electrode to ground which runs on the outer side of the housing in such a way that it has a loop standing out from the outer side of the housing, which could be made, for example, of copper wire. This loop can be cut or broken as necessary when the wheel electronics package is to be installed on the wheel, for which purpose the loop preferably has defined break points just next to the outer side of the housing. To ensure that the line connecting the control electrode to ground is in fact interrupted before the wheel electronics package is installed in a wheel, an advantageous development of the invention provides for the housing of the wheel electronics package to be dimensioned, in accordance with the predefined installation conditions on the wheel, in such a way that installation into the wheel is possible only if the external conductor loop has previously been broken off, since otherwise the loop would interfere with mounting on the wheel location provided for the purpose.

Exemplifying embodiments of the invention are shown schematically in the appended drawings.

Figure 1:
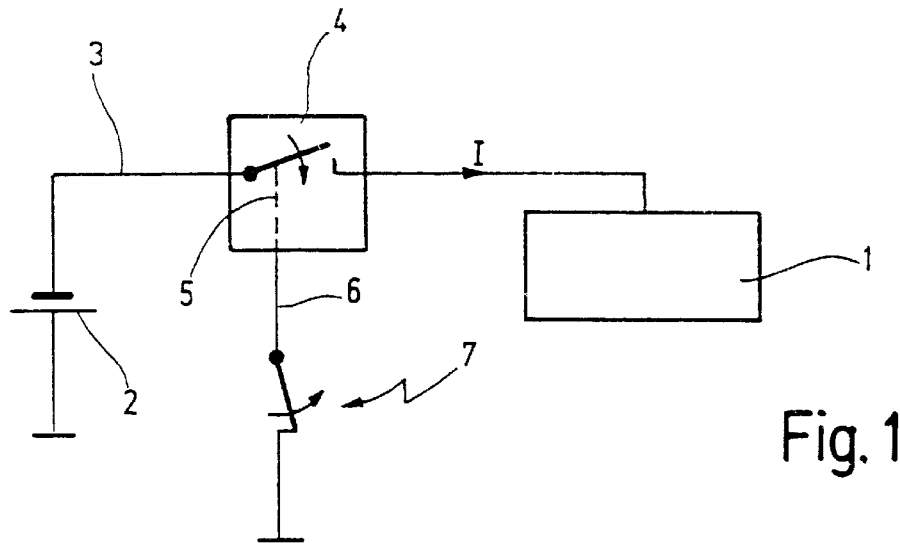
FIG. 1 shows a simplified circuit diagram of the invention.
Figure 2:
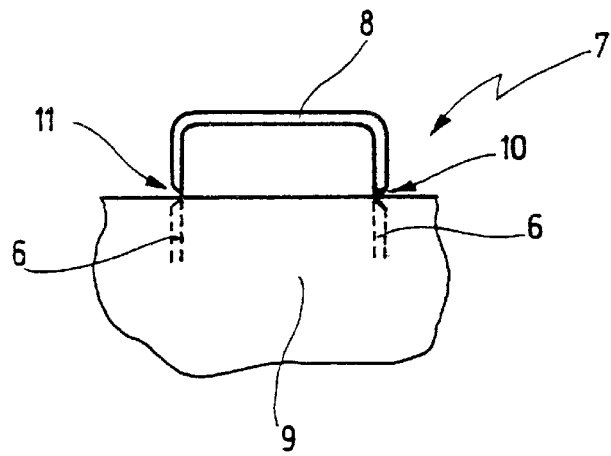
FIG. 2 shows, as a detail, a conductor loop, intended to be broken off, on the outer side of the housing of an apparatus according to the present invention.

FIG. 1 shows the highly simplified circuit diagram of a wheel electronics package, having a subassembly 1 which contains a pressure sensor, a transmitter, and an electronic circuit for operating the pressure sensor and the transmitter. The wheel electronics package further contains, in order to supply power to subassembly 1, a battery 2 which is connected to subassembly 1 via a power supply line 3 in which a transistor switch 4 is located. The transistor switch has a control electrode 5 which is connected via a line 6 to ground. As long as control electrode 5 is connected to ground, transistor switch 4 is in its nonconductive state as shown in FIG. 1. If line 6 is interrupted, the transistor switch transitions into its conductive state and supplies power to subassembly 1. For this purpose, there is provided in line 6 an interrupter 7 which, in the exemplifying embodiment according to FIG. 2, is a conductor loop 8 that is located outside a housing 9 in which subassembly 1, battery 2, transistor switch 4, and power supply line 3 are located in hermetically enclosed fashion. In order to form conductor loop 8, line 6 passes out of housing 9 and for that purpose can be embedded into the housing wall. Provided at each of the two base points of conductor loop 8 on the housing outer side are respective defined break points 10 and 11, which facilitate breakage of conductor loop 8. The dimensions of conductor loop 8 and of housing 9 are preferably matched to the predefined installation conditions of the wheel electronics package on the wheel in such a way that installation into the wheel cannot occur until after conductor loop 8 has been broken off.

Figure 3:
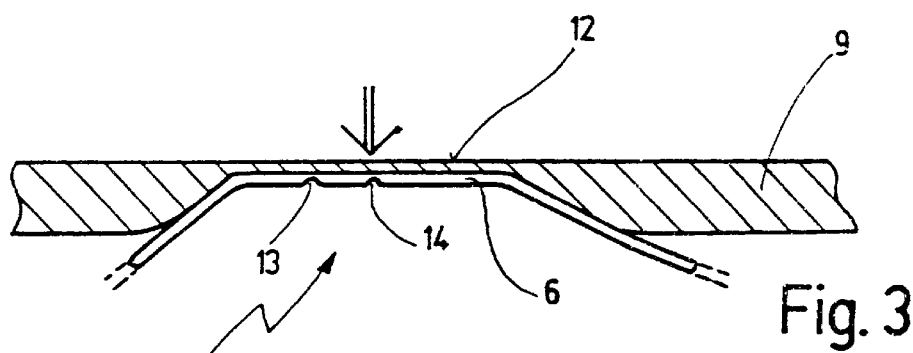
FIG. 3 shows a flexibly configured segment of the outer wall of the housing of an apparatus according to the present invention, with a breakable conductor path in the closed state.
Figure 4:
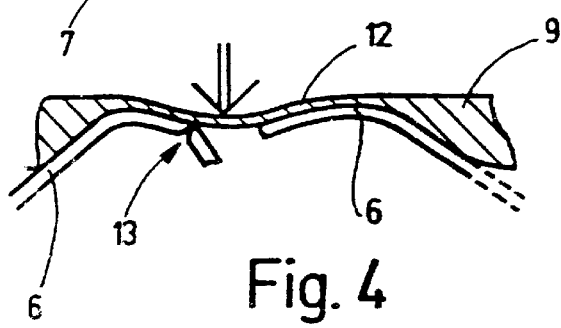
FIG. 4 in the broken state.

Another possibility for breaking line 7 from the outside despite the hermetic sealing of housing 9 is shown in FIGS. 3 and 4. In this case the outer wall of housing 9 has a segment 12 with a reduced thickness; this segment can be pushed inward by pressure from outside, for example with a finger. A brittle segment of line 6 passes along the inner side of the housing wall, in particular in the flexibly configured segment 12. The brittleness can be achieved, for example, by using for the creation of this brittle segment of line 6 a conductive paint whose constituent component is a brittle, easily breakable synthetic resin. In addition, there are provided in line 6 two defined break points 13 and 14 which facilitate breakage of line 6 when pressed from outside (FIG. 4).

What is claimed is:

1. An apparatus for monitoring tire pressure on automobiles, having an arrangement (1), intended for installation into a wheel, made up of a pressure sensor, a transmitter, and a circuit for operating the pressure sensor and transmitter, and having a battery (2) which supplies the circuit with power via a power supply line (3), the arrangement (1) and the battery (2) being located in a sealed housing (9), wherein there is located in the power supply line (3) an electronic switch (4) which has a control electrode (5) and is nonconductive when the control electrode (5) is connected to ground, where the line (6) can be permanently interrupted between the control electrode (5) and ground by a measure to be effected on the housing (9), for purposes of setting the arrangement into operation.

2. The apparatus as defined in claim 1, wherein the housing (9) has a housing wall with a flexibly configured segment (12) on the inner side of which is arranged an interrupter (7) that can be opened by being pressed in and is located in the line (6) which connects the control electrode (5) to ground.

3. The apparatus as defined in claim 1, wherein the housing (9) has a housing wall with a flexibly configured segment (12) on the inner side of which is arranged a segment of the line (6) connecting the control electrode (5) to ground that can be broken off by being pressed in.

4. The apparatus as defined in claim 3, wherein the line (6) which connects the control electrode (5) to ground has one or more defined break points (13, 14) on the flexibly configured segment (12) of the housing wall.

5. The apparatus as defined in claim 1, wherein the line which connects the control electrode (5) to ground runs partially on the outer side of the housing (9).

6. The apparatus as defined in claim 5, wherein that portion of the line (6) connecting the control electrode (5) to ground which runs on the outer side of the (9) has a loop (8) standing out from the outer side of the housing (9).

7. The apparatus as defined in claim 6, wherein the loop (8) has defined break points (10, 11) just next to the outer side of the housing (9).

8. The apparatus as defined in claim 6, wherein the housing (9) with the externally located loop (8) is dimensioned, in accordance with the predefined installation conditions on the wheel, that installation into the wheel absolutely requires that the loop (8) first be broken off.

9. The apparatus as defined in claim 7, wherein the housing with the externally located loop is dimensioned, in accordance with the predefined installation conditions on the wheel, that installation into the wheel absolutely requires that that loop first be broken off.

* * * * *

UNITED STATES PATENT AND TRADEMARK OFFICE
CERTIFICATE OF CORRECTION

PATENT NO.     : 6,124,786
DATED          : September 26, 2000
INVENTOR(S)    : Normann, et al.

It is certified that error appears in the above-identified patent and that said Letters Patent is hereby corrected as shown below:

<u>Title page,</u>
Item [73] Assignee should read -- Beru Aktiengesellshaft, Ludwigsburg, Germany --.

Signed and Sealed this

Second Day of October, 2001

Attest:

*Nicholas P. Godici*

NICHOLAS P. GODICI
*Acting Director of the United States Patent and Trademark Office*

*Attesting Officer*